United States Patent [19]
Protzman

[11] 3,833,196
[45] Sept. 3, 1974

[54] CAMERA SUPPORT
[75] Inventor: John M. Protzman, Dayton, Ohio
[73] Assignee: The Ever-Roll Manufacturing Corp., Dayton, Ohio
[22] Filed: July 10, 1972
[21] Appl. No.: 270,506

[52] U.S. Cl. ................................. 95/86, 248/208
[51] Int. Cl. .......................................... G03b 17/56
[58] Field of Search ...................... 95/86; 248/208

[56] References Cited
UNITED STATES PATENTS
2,636,822   4/1953   Anderson ............................. 95/86
2,804,278   8/1957   Jewett ................................. 95/86 X
3,057,283   10/1962   Mashburn ........................... 248/208

Primary Examiner—John M. Horan
Attorney, Agent, or Firm—Biebel, French & Bugg

[57] ABSTRACT

A camera support adapted to be attached to an automobile window or similar, plate-like surface. The support includes a base frame, a pair of clips adapted to engage over an upper edge of a window, and a pair of downwardly projecting legs adapted to engage the inner surface of the window. A camera platform is mounted on the base frame in a manner that provides for movement of the camera platform about at least two mutually perpendicular axes.

10 Claims, 13 Drawing Figures

PATENTED SEP 3 1974
3,833,196
SHEET 1 OF 2
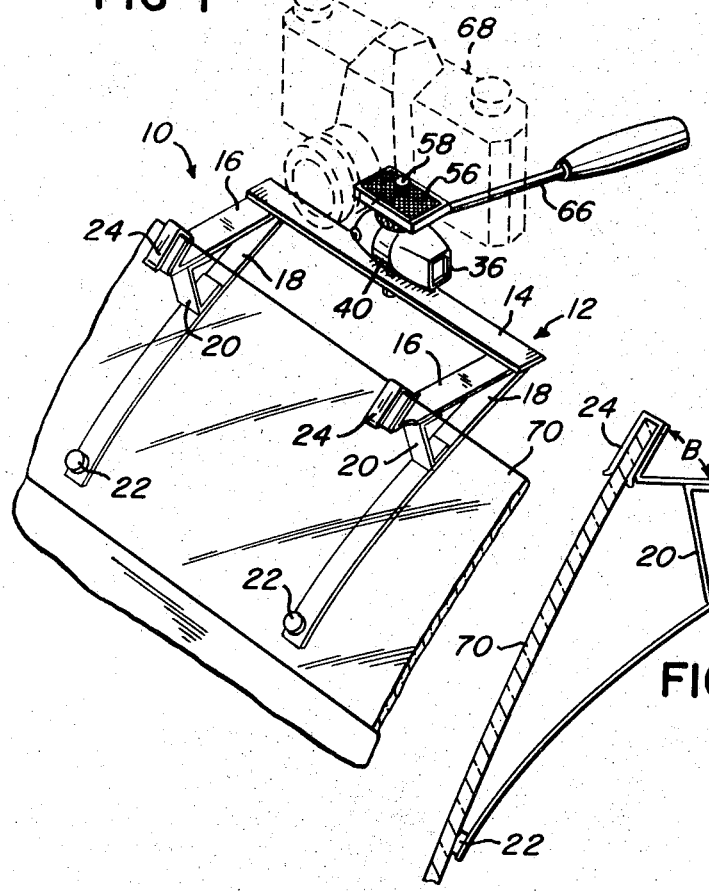
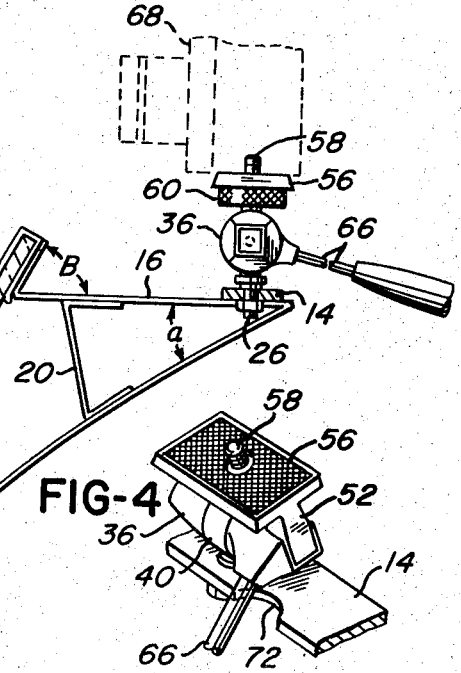
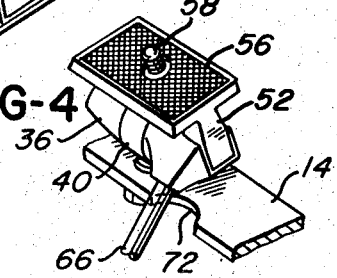
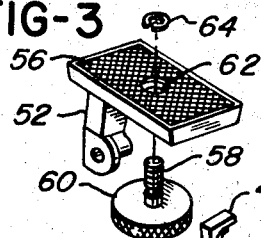
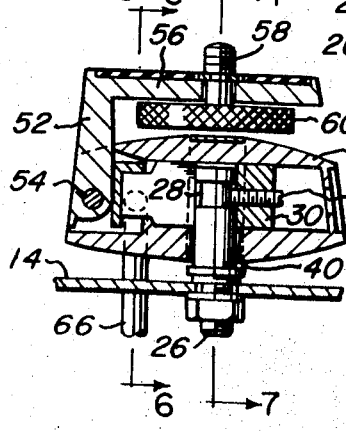
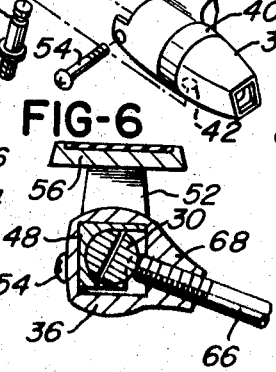
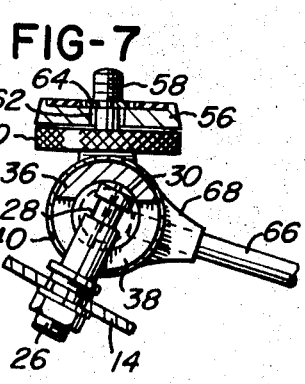

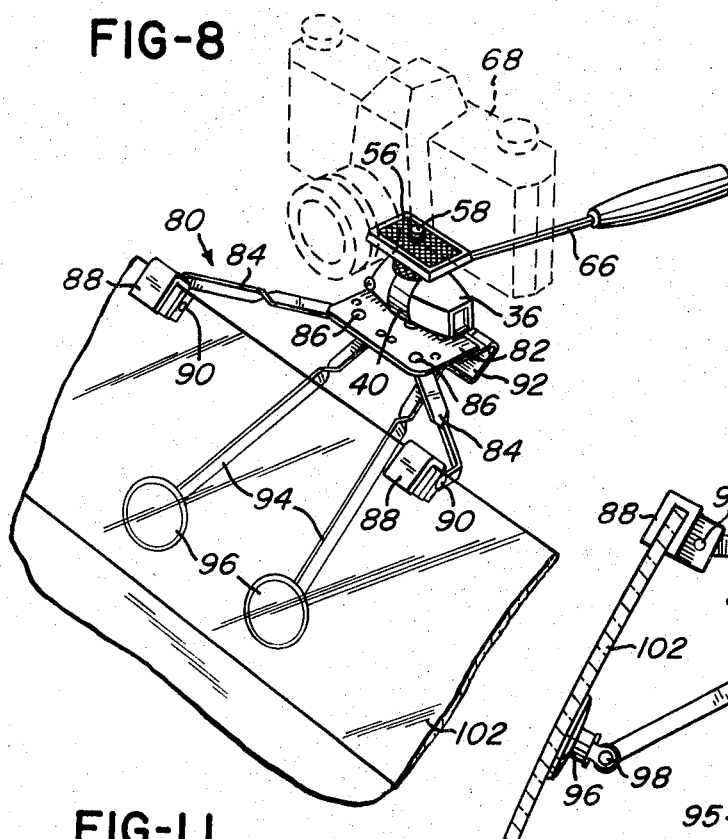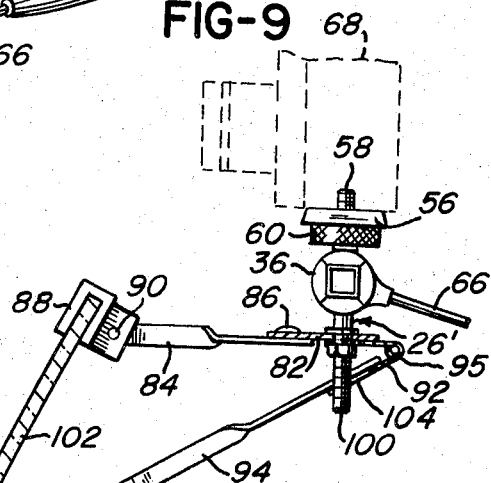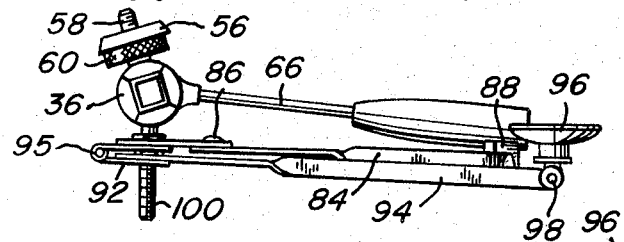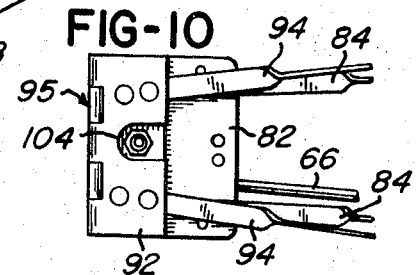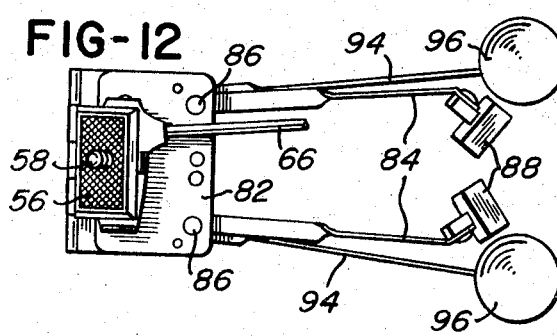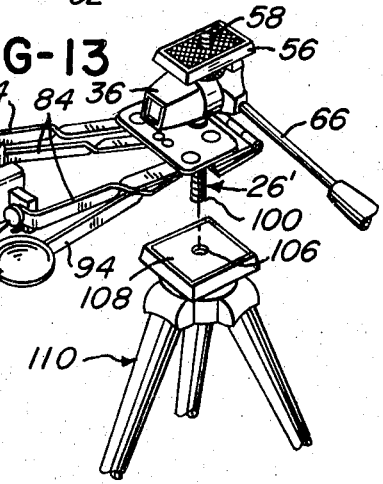

OPTICAL SCANNING SYSTEM FOR PHOTOCOPYING

This invention relates to an improved optical scanning system for photocopying apparatus. The invention is an improvement of a type of apparatus having an optical scanning system which comprises an objective and a movable mirror system and in which, when this mirror system is moved from one end position to another, a light source providing a strip of light scans an original lying on a support so that light rays reflected to form an image of the original are projected onto a moving light-sensitive layer.

In a known apparatus of that type, as shown in U.S. Pat. No. 3,543,290, originals placed on a glass plate are exposed stripwise by passing below them a light source to which a mirror is rigidly attached, so that the mirror directs the light reflected by the original to a second mirror arranged perpendicular to the plane of the glass plate, and the band of light rays is deflected to a fixed objective having its axis inclined relative to the glass plate. Upon then passing through the objective and a fixed mirror the reflected light finally reaches a moving light-sensitive layer to generate a latent image thereon.

Such known apparatus is quite suitable for making copies from books and the like. It has, however, an important disadvantage in that after scanning the original the optical system must be returned to its initial position before a subsequent copy can be made. This results in much loss of operating time. The inefficiency of such a procedure is particularly evident when single-sheet originals are to be copied instead of pages from books.

The object of this invention is to provide an improved optical scanning system for apparatus of the type mentioned and to render such apparatus more suitable for copying single-sheet originals.

According to the present invention, an apparatus is provided of the type mentioned in the opening paragraph, in which a stationary exposure slit is provided at a location to a side of the support upon which originals may be laid to be copied, so that light reflected through this slit when the mirror system is held in a certain position will be directed into the objective and thence to the moving light-sensitive layer in the path used for the reflected scanning light, and means are provided to carry sheet-shaped originals over the exposure slit.

In this way apparatus is obtained in which, with the use of one and the same objective and image-forming system, single-sheet originals can be passed quickly through an exposure station for slit exposure, and even in an uninterrupted succession if so desired, yet it is also possible to copy originals such as books which normally cannot be passed mechanically through an exposure station suited for sheet-shaped originals in motion.

The invention can be carried out in various ways.

For instance, the scanning system with movable mirrors may be caused to occupy a rest position so located that when it is in that position the scanning light is directed automatically to the exposure slit.

According to another embodiment, the scanning system is designed so that when the movable mirrors are in an end position at least one of these mirrors can be displaced (pivoted away or shifted aside) out of its normal position, in which it directs light reflected from originals on the said support into the path to the objective, so as to occupy another position in which light reflected from originals at the exposure slit will be directed into that same path.

Photocopying apparatus of the type described often has an odd or an even number of mirrors, depending upon the process employed. When switching from copying books and the like to copying sheet-shaped originals, an odd or even number of active mirrors, respectively, must of course still be used in order to obtain legible copies in both working conditions. Accordingly, when so switching the working conditions the number of active mirrors either must remain unchanged or must be changed by two or a multiple of two. According to the invention this requirement can be fulfilled in a convenient manner by providing in the mirror system at least two mirrors ahead of the objective, as viewed in the direction from said support along the path of the reflected light, and mounting the second mirror, and viewed in the same direction, so that it can be hinged away or shifted aside. In this way, by moving only one mirror two mirrors are made either active or inactive.

Normally, the support for receiving originals to be copied is a horizontal glass plate, and the means for carrying the sheet-shaped originals along the exposure slit desirably is arranged horizontally adjacent to this glass support plate. This provides a practical arrangement of the two copying systems, with good accessibility of the two, a minimum requirement of space, and other conveniences.

The movable mirror system of a copying apparatus according to the invention may comprise two mirrors which normally are disposed so as to define an angle of 90° and are movable together as a unit in a path inclined relative to the plane of the said support for originals to be copied, and which are so mounted that one of these mirrors, preferably the one first struck by the light reflected from originals on said support, is displaceable out of the path of that light by being pivoted away or shifted aside.

Another suitable movable mirror system may comprise a mirror which normally is perpendicular to the plane of said support yet can be pivoted away or shifted aside, in which case the light reflected from an original through the fixed exposure opening or slit preferably passes directly to the objective, i.e. without the interposition of a mirror. In this case the sheet transport means and the fixed exposure opening are arranged to a side of the glass plate other than that which they occupy in the more normal arrangement referred to above, yet the position of the objective and the path of the light transmitted through it remain unchanged.

The invention can be embodied advantageously in apparatus in which the standstill position occupied by the mirror system in order to expose sheet-shaped originals passing over the exposure slit is located outside the path which the mirror system follows when scanning originals lying on said support. Thus the horizontal dimensions of the apparatus can be kept small, enabling optimum utilization of the available space.

The invention will now be further explained in the following detailed description and by reference to the accompanying drawings of illustrative embodiments thereof.

In the drawings:

An upstanding post 26 is mounted, as best seen in FIG. 7, on the cross member 14 and projects normally upwardly from an upper face thereof approximately centrally of the length of the cross member 14. The upper end of the post 26 is relieved as at 28 and is received, as best seen in FIG. 3, in a horizontal post 30 in an opening 32 therein.

A set screw 34 is threadably received in the horizontal post 30 and its inner end is received in the relieved portion 28 of the post 26 but in noncontacting relation thereto. Thus, the post 30 may swivel about the axis of the post 26. At the same time, the post 30 is slidably received within a complementary socket within the shell 36. The shell 36 is provided with a slot portion 38 extending over slightly more than half of its circumference and covered by a circular band 40 received in a relieved portion of the body 36. The post 26 projects through an opening 42 formed in the band 40.

A keeper 44 lies over a reduced end 50 of the horizontal post 30 and is retained in position by the downwardly depending leg 52 which is pivotally attached to the shell 36 by means of a bolt or the like 54. A camera platform 56 extends at right angles to the leg 52 and a threaded post 58 having a knurled knob 60 is retained in position projecting upwardly through an opening 62 in a platform 56 by means of a snap ring 64.

It will also be seen that the post 30 is of split construction, as best seen in FIGS. 3 and 6, and a threaded shaft 66 is threadably received in an extension 68 of the shell 30 and is adapted to engage the reduced portion 50 of the post 30 when the shaft is threaded into the shell 36. This will cause the split post 30 to clamp about the upper end of the vertical post 26, locking the shaft against movement about the post 26. At the sametime, the engagement of the shaft 66 with the post 30 will also prevent pivotal movement about the axis of the post 30.

A camera, shown in dotted lines at 68 in FIGS. 1 and 2, will generally be provided with a threaded socket which receives the threaded post 58 to lock the camera to the platform 56. Of course, the pivotal connection at 54 permits the camera to be turned sideways if desired.

With the above construction, which per se does not constitute the present invention, it will be seen that the shell 36 may be rotated about the fixed, vertically extending post 26 to provide swivelling movement about the axis thereof while the shell 36 may be pivoted about the horizontal post 30 since it is slidably received therein. Obviously other similar structures may be used to accomplish the same results.

It will be seen the camera support of the present invention may be readily attached to a window 70 of an automobile or the like with the clips 24 engaging the top edge thereof and the feet 22 engaging an inner surface thereof. Due to the acute angular relationship of the clips to the base frame the post 26 is substantially vertically oriented. This permits the platform to remain horizontal as it is swivelled about the post 26 and consequently provides greater freedom in adjusting the platform and camera attached thereto to the position desired. It will also be noted from FIG. 4 that a notch 72 is provided in the base frame cross member 14 to accommodate the threaded shaft 66 when the platform is pivoted inwardly.

Turning now to FIGS. 8 through 13 of the drawings, a second preferred embodiment of the invention will be described. The camera mount 80, as best seen in FIGS. 8 and 9, includes a main or base frame 82 having a pair of outwardly projecting arms 84 pivotally attached thereto as at 86 and carrying a pair of clips 88 at their outer most ends pivotally mounted thereon, as at 90. Preferably the clips 88 are formed from some tough yet resilient material such as nylon or the like.

A pair of stabilizing legs 94 are pivotally attached to the main frame 82 by means of a hinge plate 92, hinged, as at 95, to the back end of the main frame 82. The lower ends of legs 94 are provided with suction cups 96, which in turn are pivotally attached thereto at 98.

The swivel post 26' is somewhat longer than the swivel post 26 shown in the embodiment of FIGS. 1 through 7 of the drawings in that it has an elongated threaded extension 100 for a purpose presently to be described. In all other respects, however, the camera platform, the pivoting and swiveling mechanism for the platform and the locking mechanism may be as shown in FIGS. 1 through 7 of the drawings.

By virtue of the hinge connection between plate 92 and frame 82, it will be apparent that the arms 84 and the legs 94 may be disposed in substantially overlying relationship, as seen in FIG. 11, or that the angular disposition of one with respect to the other may be infinitely varied. This, together with the pivotal mounting of the arms 84 on the base frame and the pivotal mounting of the clips on the arms, provides infinite adjustability of the camera support to a variety of planar surfaces, regardless of their slope or inclination.

Thus, with a typical, inwardly sloping automobile window 102, as shown in FIGS. 8 and 9 of the drawings, after the arms are pivoted outwardly to the extent that the clips 88 may be slipped over the upper edge of the window, the angular disposition of the legs 94 with respect to the base frame is adjusted to dispose the swivel post 26' substantially vertical, after which the suction cups 96 are attached to the inner surface of the window. Obviously if the window was at some other angular disposition, including substantially vertically or outwardly inclined, the camera mount of the present invention could be attached thereto while still permitting the swivel post 26' to be disposed substantially vertically. This is important in that the swivelling movement of the platform about the post 26' will result in the camera tilting to either side as it is swivelled if the swivel post is other than vertical.

As noted above and as seen in FIG. 11, the arms and legs of the camera mount are adapted to be folded in overlapping relationship. In this regard, it will be noted from FIG. 10 that the plate 92 is notched, as at 104, to provide clearance for the downwardly depending portion 100 of the swivel post. Thus, in addition to being readily attachable to windows or the like, regardless of their slope or inclination, the camera mount of the present invention may also be utilized with a standard camera tripod.

When used in this manner, it will generally be desirable to pivot the arms 84 inwardly to the position shown in FIG. 12 of the drawings and, with the arms 84 and legs 94 thereafter folded to the configuration shown in FIG. 11, the threaded extension 100 of the swivel post 26' may be threaded into a complementary threaded opening 106 in the base 108 of the tripod 110.

Of course, it will be apparent that in the embodiment of the invention shown in FIGS. 1–7 of the drawings, a threaded extension may also be used to mount the support on a tripod. However, the compactness of the embodiment of FIGS. 8–13 when folded makes it particularly adapted for this type of use.

The collapsible feature of the present invention is also desirable for storage purposes and in this regard it should be noted that when the collapsed camera mount is being stored the handle 66 will normally be swivelled from its normal operating position to that shown in FIGS. 11 and 12 to provide additional compactness.

From the above it will be apparent that the present invention provides a stable camera support which is nevertheless easily attached and detached to and from an automobile window or the like and is of inexpensive construction.

While the products herein described constitute preferred embodiments of the invention, it is to be understood that the invention is not limited to these precise articles, and that changes may be made therein without departing from the scope of the invention.

What is claimed is:

1. A camera support adapted to engage a car window and position a camera within the car comprising:
   a. a supporting base frame,
   b. a pair of arms projecting outwardly from said base frame,
   c. downwardly opening clip means mounted on outer ends of said arms and adapted to engage the upper edge of a car window to which the support is attached with said base frame positioned within the car,
   d. stabilizing means mounted on said base frame and projecting downwardly therefrom at an acute included angle with said outwardly projecting means to engage an inner face of the car window whose upper edge is engaged by said clip means,
   e. camera engaging means,
   f. means mounting said camera engaging means on said base frame with said camera engaging means thereby positioned within the car with which the support is associated while permitting movement thereof about at least two mutually perpendicular axes, and
   g. means for locking said camera engaging means in a preselected position with respect to said base frame.

2. The support of claim 1 wherein:
   a. said clip means mounted on outer ends of said arms form an acute angle therewith.

3. The support of claim 2 wherein said clip means comprises:
   a. substantially U-shaped clips.

4. A camera support comprising:
   a. a supporting base frame,
   b. downwardly opening clip means adapted to engage the upper edge of a car window to which the support is attached,
   c. a pair of arms projecting outwardly from said base frame with said clip means pivotally mounted on the outer ends of said arms,
   d. stabilizing means mounted on said base frame and projecting downwardly therefrom to engage a face of the car window whose upper edge is engaged by said pivotally mounted clip means,
   e. camera engaging means,
   f. means mounting said camera engaging means on said base frame for movement of said camera engaging means about at least two mutually perpendicular axes, and
   g. means for locking said camera engaging means against said movement about said perpendicular axes in a preselected position with respect to said base frame.

5. The support of claim 4 further comprising:
   a. means pivotally attaching said arms at their inner ends to said base frame.

6. A camera support comprising:
   a. a supporting base frame,
   b. downwardly opening clip means adapted to engage the upper edge of a car window to which the support is attached,
   c. means pivotally mounting said clips means on said base frame,
   d. leg means pivotally attached to said base frame and projecting downwardly therefrom to engage a face of the car window whose upper edge is engaged by said pivotally mounted clip means,
   e. camera engaging means,
   f. means mounting said camera engaging means on said base frame for movement of said camera engaging means about at least two mutually perpendicular axes, and
   g. means for locking said camera engaging means against said movement about said perpendicular axes in a preselected position with respect to said base frame.

7. The support of claim 6 further comprising:
   a. suction cup means mounted on an end of said leg means opposite said pivotal mounting to said base frame.

8. The support of claim 7 further comprising:
   a. means pivotally attaching said suction cup means to said leg means.

9. The support of claim 8 wherein said leg means comprises:
   a. a pair of spaced legs.

10. A camera support comprising:
    a. a base frame,
    b. a pair of arms pivotally attached to said base frame and projecting outwardly therefrom,
    c. a substantially U-shaped clip pivotally mounted on an outer end of each of said arms for pivotal movement about an axis perpendicular to the axis of the pivotal attachment of said arms to said base frame,
    d. a hinge plate attached to said base frame along an edge thereof spaced from said pivotal attachment of said arms to said base frame,
    e. a pair of legs attached to said hinge plate and projecting outwardly therefrom,
    f. a suction cup for each of said legs,
    g. means pivotally attaching each of said suction cups on an outer end of each of said legs for pivotal movement about an axis perpendicular to axes of said pivotal attachment of said arms to said base frame,
    h. a camera platform,
    i. means mounting said platform on said base frame for pivotal and swivel movement with respect thereto about mutually perpendicular axes, j. means for locking said platform against said pivotal and swivel movement in a preselected position on said base frame, and k. an elongated threaded extension of the axis of said swivel movement of said camera platform projecting from said base frame away from said camera platform.

* * * * *

UNITED STATES PATENT OFFICE
CERTIFICATE OF CORRECTION

PATENT NO. : 3,833,196
DATED : September 3, 1974
INVENTOR(S) : John M. Protzman

It is certified that error appears in the above-identified patent and that said Letters Patent are hereby corrected as shown below:

Columns 1 and 2 should read as follows:

CAMERA SUPPORT

Background of the Invention

In photography it is often desirable to provide an essentially immobile support for a camera, particularly when using slower shutter speeds. Generally, this takes the form of a tripod having a movable camera engaging platform which can be locked in position. There are also a number prior art patents which disclose means for mounting a camera on articles other than a tripod. For example, U.S. Patent No. 1,280,013 discloses a camera mounting bracket which may be attached to a chair back. Perhaps because cameras are so often taken on automobile trips, there have also been attempts to design camera mounts which may be installed or attached to automobiles. For example, U.S. Patents No. 2,804,278 and 3,176,602, both disclose camera supports adapted to be attached to an automobile. Despite the activity in this particular area, however, a need exists for a camera support which may be readily attached and detached from an automobile, yet is relatively inexpensive to manufacture while still providing a firm stable support. Additionally, it is desirable that such a mount be capable of use with a variety of different types of automobiles, as well as with a tripod or other conventional stand.

Summary of the Invention

The camera support of the present invention is particularly adapted to be attached to the side window of an automobile and is provided with a pair of clips for engaging the upper edge of a partially lowered automobile window and a pair of downwardly depending legs for engaging the inner surface of the window. A camera platform is mounted on the support for swivelling and pivotal movement about a pair of mutually perpendicular axes and means are provided for locking the platform in some preselected position.

Thus, the present invention is readily attached and detached from the automobile, yet firmly engages the window thereof to provide the camera with the stability of the automobile itself. Additionally, the camera support is of relatively uncomplicated construction and is thus relatively inexpensive to produce.

The side windows of most automobiles slopes inwardly. Therefore, in accordance with the present invention this inward curvature or sloping is accommodated to place the swivel post of the camera platform approximately vertical.

Thus, in one embodiment of the invention wherein the components are relatively fixed with respect to each other, the clips are disposed at an acute angle to the base frame, this angle being selected as an approximate average of the inclination of the side windows of most automobiles. By providing some degree of flexibility between the clips and the base frame and by forming the downwardly depending legs as resilient members some deviation from this average angle of inclination can be tolerated and the swivel post of the camera mount still disposed approximately vertical.

In another embodiment of the invention the window engaging clips are pivotally mounted on arms, which are also pivotally attached to the base frame, and the downwardly depending legs are hinged to the base frame and provided with pivotally attached suction cups at their lower ends.

With this latter construction, it is immaterial whether the window or other surface to which the camera mount is attached is vertical or sloped, since the above construction provides for an almost infinite variety of adjustments while still permitting the swivel post of the camera to be placed approximately vertical.

In either case, the present invention provides a camera mount which can be readily attached to an automobile or detached therefrom and, while being of relatively inexpensive construction, nevertheless provides a stable support for photographic work.

Patent No. 3,833,196

Brief Description of the Drawings

Fig. 1 is a perspective view of the camera mount of the present invention attached to an automobile window and showing a camera in dotted lines mounted thereon;

Fig. 2 is a side view of the camera support of Fig. 1;

Fig. 3 is an exploded perspective of the camera platform and locking means therefor;

Fig. 4 is a perspective view of the camera platform and base frame;

Fig. 5 is a cross sectional view through the camera platform and a portion of the base frame;

Fig. 6 is a view taken on line 6--6 of Fig. 5;

Fig. 7 is a view taken on line 7--7 of Fig. 5;

Fig. 8 is a perspective view similar to Fig. 1 showing a second preferred embodiment of the drawings;

Fig. 9 is a view similar to Fig. 2 but showing the embodiment of Fig. 8;

Fig. 10 is a bottom view of a portion of the second preferred embodiment of the invention;

Fig. 11 is a side view of the camera mount of Fig. 8 with the components thereof in the collapsed position;

Fig. 12 is a top view thereof; and

Fig. 13 is an exploded perspective view showing the camera mount of Fig. 8 associated with a standard tripod.

Description of the Preferred Embodiments

As best seen in Figs. 1 and 2, the camera support 10 of the present invention includes a base frame 12 including a cross member 14 and a pair of side members 16 projecting outwardly from opposite ends of the cross member. The side members 16 are disposed substantially coplanar with the cross member 14, being offset slightly therefrom by reason of thickness of the members.

Extending downwardly from the base frame 12 are a pair of resilient legs 18 which define an acute, included angle a with the side members 16. To provide greater strength to the unit, interconnecting frame members 20 extend between each side member 16 and its respective leg 18. Additionally, feet 22 are preferably provided at the lower ends of the legs and these may take the form of suction cups if desired.

Patent No. 3,833,196

Attached to an end of each of the side members 16 opposite their point of attachment to the cross member 14 are clips 24 of substantially U-shaped configuration. Preferably, each of the clips is formed of a resilient material such as sheet metal, nylon or the like and is disposed at an acute included angle $\underline{B}$ with respect to the side member to which it is attached.

Signed and Sealed this sixteenth Day of March 1976

[SEAL]

Attest:

RUTH C. MASON
*Attesting Officer*

C. MARSHALL DANN
*Commissioner of Patents and Trademarks*